3,429,438
AIR SEPARATION MEANS FOR POTATOES
James J. Palmen and John D. Strandlund, Mora, Minn., assignors to Braco, Inc., Braham, Minn., a corporation of Minnesota
Filed Aug. 11, 1966, Ser. No. 571,932
U.S. Cl. 209—137                                             1 Claim
Int. Cl. B07b 9/00, 3/00; A01d 17/00

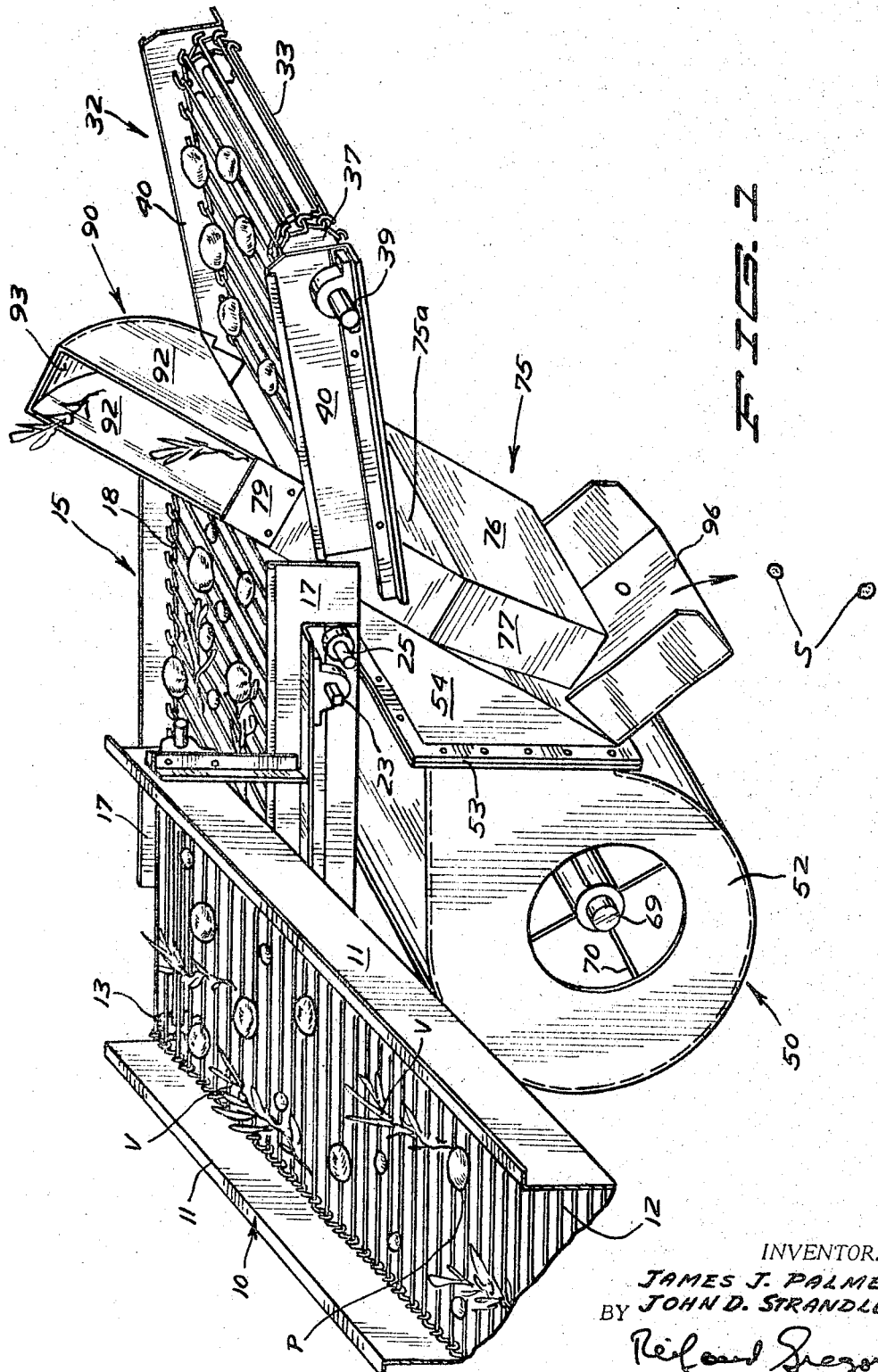

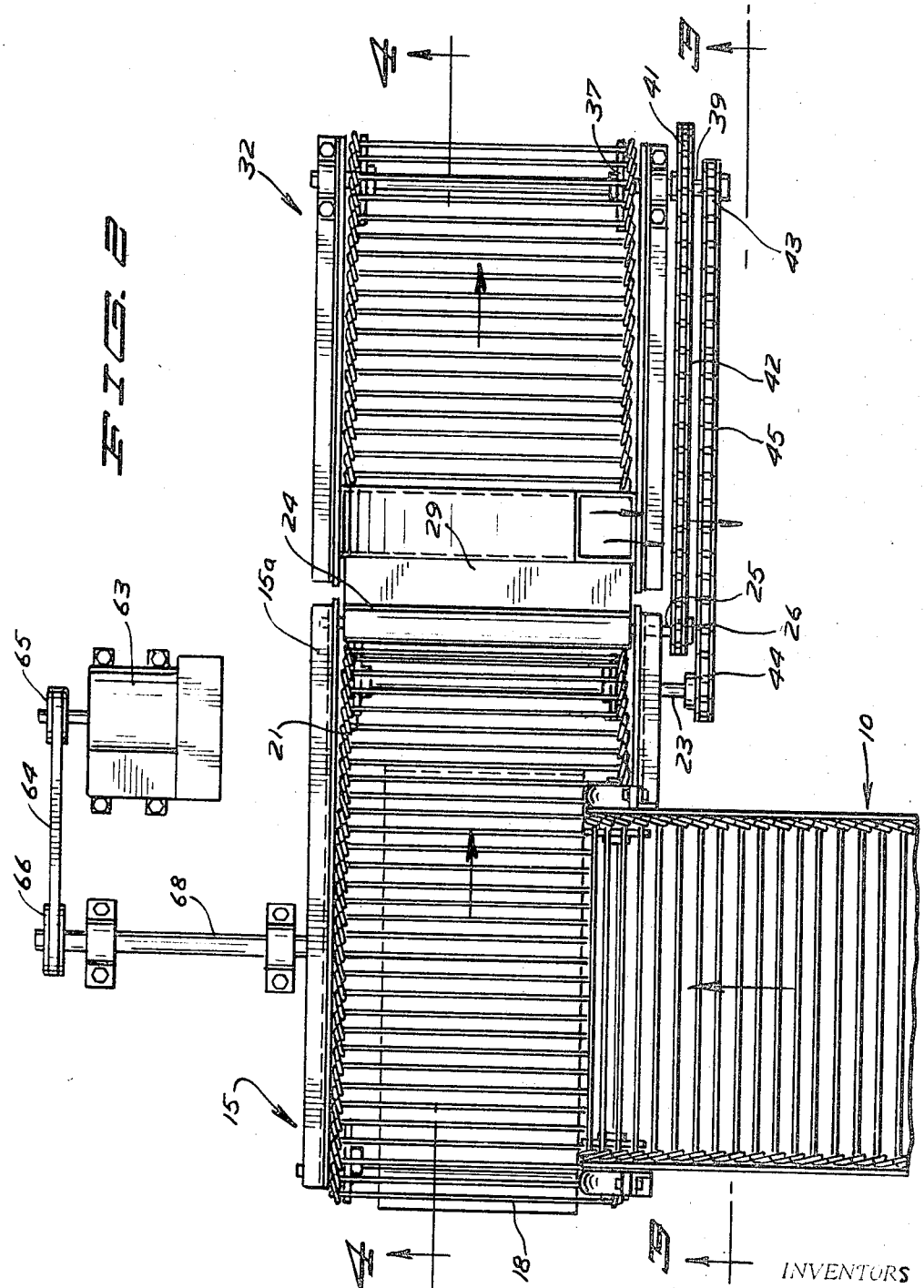

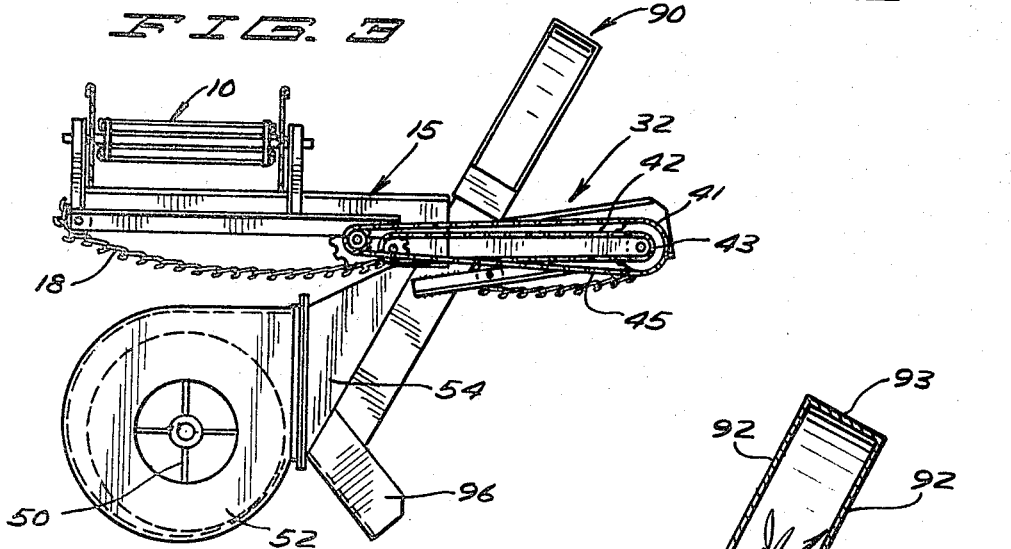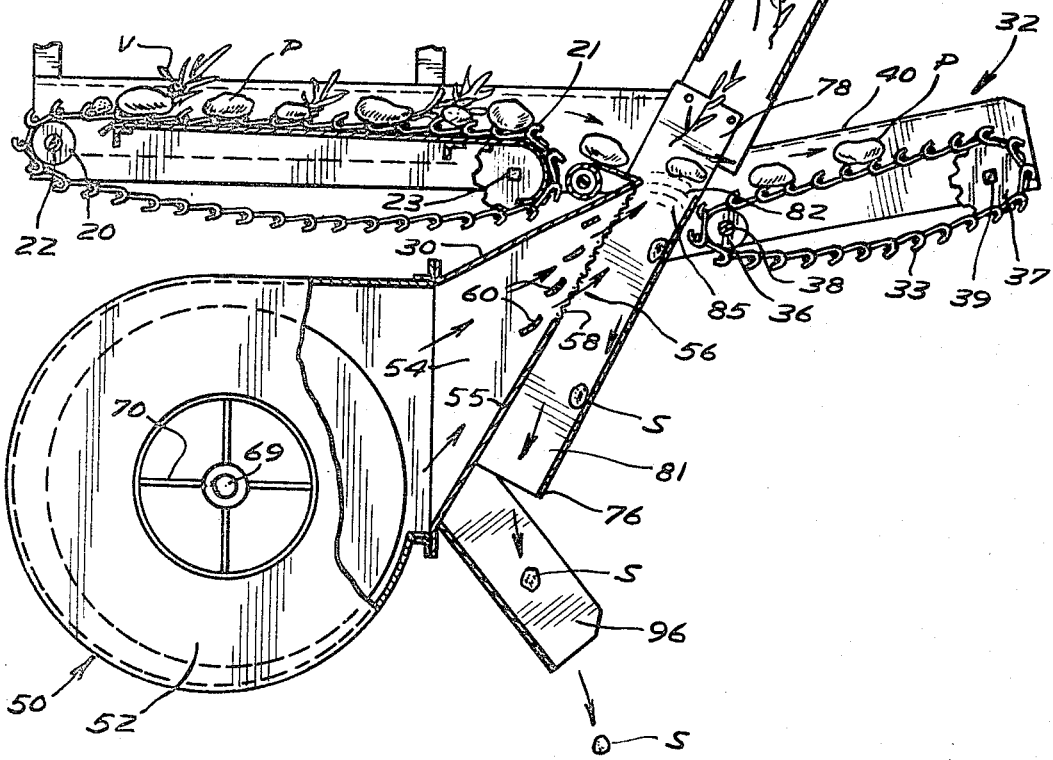

The invention herein relates to apparatus embodying improvement in the use of air for separating potatoes from stones, clods and vines. It will be understood that the apparatus disclosed herein may be used for root crops other than potatoes.

There is known equipment in the prior art using air as a blowing or suction medium for separation of potatoes, as indicated by the subject matter of U.S. Letters Patent Nos. 3,227,276; 2,843,264 and 2,458,224. The apparatus herein represents improvement over such equipment in providing for a more effective use of air as a separating means and in providing a simpler, and less costly piece of equipment which may be attached to a conventional harvesting machine.

It is an object of this invention therefore to provide a simply constructed apparatus for installation onto a conventional potato harvester to very simply and effectively separate potatoes from foreign matter, such as stones and clods.

It is another object of this invention to provide a simply constructed apparatus to be mounted onto a conventional potato harvester as an attachment to provide an air cushion between spaced conveyors to support the passage of potatoes from one conveyor to the other while permitting stones and clods to fall therethrough and be discharged and thus be separated from the potatoes.

More specifically it is an object of this invention to provide an air moving blower and a duct forming an air passage with the duct having an outlet disposed between a pair of conveyors, said blower and duct being arranged to provide an air cushion at said outlet to support potatoes passing from one conveyor to the other but being adapted not to support stones and clods which fall through said air cushion and through said air passage as to the ground or into a suitable receptacle and are thus separated from the potatoes.

With respect to the previous object, it is also an object of this invention to provide for the separation of vines and weeds from potatoes and for disposal of the same.

These and other objects and advantages of the invention will be set forth in the following description made in connection with the accompanying drawings in which like reference characters refer to similar parts throughout the several views and in which:

FIG. 1 is a broken view in perspective showing the subject matter of the invention herein installed in operating position;

FIG. 2 is a top plan view of the structure shown in FIG. 1;

FIG. 3 is a view on a reduced scale partially in section and partially in side elevation taken on line 3—3 of FIG. 2 as indicated; and FIG. 4 is a view in vertical section taken on line 4—4 of FIG. 2 as indicated, with a portion thereof being broken away.

The apparatus which comprises the subject matter of the invention herein is arranged and constructed to be mounted onto a conventional type of potato harvester. Only a portion of the conveyor structure of a harvester is shown, and this is believed to be all that is necessary as supporting structure for a description and illustration of the invention herein. Much of the structure herein is shown in skeleton form without supporting structure. All supporting structure is conventional and related to the chassis of the harvester, and details thereof are believed not necessary for an understanding of the structure as to one who is familiar with this art.

Referring to FIG. 1, a portion of a potato harvester conveyor 10 is shown comprising side frame members or rails 11 having therebetween an endless belt 12 shown formed of linked rods. Said belt will be supported by and pass over suitable sprockets of which sprockets 13 are shown. This conveyor will elevate potatoes P received from the digging portion of the harvester and will transfer the potatoes onto a cross conveyor 15.

Said cross conveyor 15 comprises side frame members 17 having therebetween an endless link belt 18 carried by and passing over a rearward pair of idler cones 20 and a forward pair of sprockets 21 at the discharge end thereof. Said pairs of cones and sprockets respectively are carried in a conventionalal manner by shafts 22 and 23 which are journaled in said frame members 17. The discharge end of said conveyor is indicated by the character 15a. Mounted in said frame member 17 adjacent the discharge end 15a of said conveyor 15 is a transfer roller 24 carried on a shaft 25 having a sprocket 26 carried on an extended end portion thereof. As will hereinafter be described, said roller will be arranged to rotate or travel at a rate of speed approximately twice that of said conveyor 15.

Coextensive with the length of said roller 24 and extending forwardly thereof is a flat downwardly inclined transfer apron 29 on the order of a flat plate member supported by suitable underlying frame secured strap brackets 30.

Spaced endwise from said discharge end of said conveyor 15 is a conveyor 32 comprising an endless link belt 33 passing over a pair of idler cones 36 and a pair of sprockets 37, which cones and sprockets respectively will be carried on shafts 38 and 39 journaled in side frame members 40. The frame members described in connection with the various conveyor belts will be suitably supported by the chassis of the harvester.

A sprocket 41 is mounted on an extended end portion of the shaft 39 and passing thereover and over the sprocket 26 is a sprocket chain 42. A second sprocket 43 is mounted on said shaft 39 outwardly of the sprocket 41 and a sprocket 44 is mounted on extended end portion of the shaft 23. Passing over said sprockets 43 and 44 is a drive chain 45. Suitable conventional drive means not here shown will drive the shaft 39.

Shown suitably mounted under the conveyor 15 is an air moving blower 50 mounted in a housing 52. Said housing has a substantially rectangular outlet face portion 53 having a forwardly and upwardly projecting tapered housing portion 54 having therein an outlet opening 56 having a substantially rectangular screen member 58 extending thereover.

Disposed transversely in said housing portion 54 are a plurality of baffle plates 60 somewhat arcuate or angled in cross section and suitably positioned to deflect upwardly the air passing through said housing portion.

Said blower 50 is an air moving type of blower. A suitable size of blower has been found to be one capable of moving 10,000 c.p.m. of air at a velocity on the order of 7500 f.p.m. to 8750 f.p.m.

Driving said blower is a motor 63 which will be connected to a suitable source of power and which by means of belt 64 passing over pulleys 65 and 66 drives the shaft 68 which drives the shaft 69 on which is suitably mounted the blower blades 70 within said blower housing. A motor of suitable size has been found to be one rated at 14 horsepower and developing on the order of 2000 r.p.m.

Partially overlying and utilizing said face wall 55 is a duct or chute 75 substantially rectangular in cross section and having an outer wall 76 and end walls 77 and 78. Said facing wall 55 and said air screen 58 form the inner wall of said duct 75. Said duct forms an air passage 81 therein. The upper portion 75a of said chute 75 tapers somewhat. The end walls of said chute extend somewhat above the inner sides of the side frame member 17 and somewhat above the height of the outer wall of said chute which extends approximately to the same height as said screen 58. The upper end of said outer wall 76 together with the upper end of said air screen 58 and adjacent portions of the end walls 77 and 78 form an air outlet 82 at which point an air cushion 85 is indicated, as will be further described. Said air outlet has a length extending the width of the conveyors 15 and 32 and a width on the order of six inches to receive stones and clods.

Extending above said chute 75 in alignment with said air outlet 82 is an arcuate chute 90 having side walls 92 in the form of sectors and a curved upwardly extending end wall 93 forming a deflector. Said chute is secured to the upper ends of the end walls 77 and 78 by plate brackets 79. The lower portion of said arcuate chute 90 is vertically spaced above said air outlet sufficiently to permit the passage of potatoes thereunder.

The lower end 81 of said chute 75 is open forming a discharge outlet. Secured to the lower portion of the outer face portion 53 of the housing 52 is a short chute 96 U-shaped in cross section underlying the open discharge end of the chute 75 and serves as a deflector to discharge to the ground stones and clods passing thereover through said chute 75.

For purpose of reference, stones and clods are indicated by the character S, and vines and weeds by the character V.

Operation

The mechanism herein for separating potatoes from stones and clods may be attached as special equipment attachable to a conventional type of potato harvester with some modification of conveyors of the harvester.

With the mechanism installed as above described, potatoes from the digging portion of the harvester will be delivered to and elevated by the conveyor 10 and from there will be transferred to a cross conveyor 15 which terminates short of the air outlet 82. Adjacent the discharge end of said conveyor 15 is the transfer roller 24 which rotates at approximately twice the speed of the travel speed of said conveyor. Extending from said transfer roller to said air outlet 82 is the transfer apron 29. The transfer roller 24 travels faster than said conveyor 15 in order to prevent any accumulation or buildup of potatoes and stones or clods at the discharge end of said conveyor 15. It will be understood that vine particles and stones and clods are delivered to the conveyor 10 along with the potatoes.

With the harvester in operation, the blower 50 will be operating. Air is delivered through the air passage 81 and to the air outlet 82 at a velocity from 7500 f.p.m. to 8750 f.p.m. With this velocity of air, a sufficient air cushion is generated at the outlet 82 to support potatoes which have a specific gravity of .9. The potatoes come off of the conveyor 15 with sufficient travel speed to roll across the air curtain or air cushion 85 over to the conveyor 33. Stones and clods which have a substantial greater specific gravity than potatoes fall through said air cushion 85 to be discharged to the ground. Vines and weeds are moved upwardly by the air passing through said outlet 82 to be delivered into and deflected for discharge to one side of the harvester by the deflecting chute 90. This material is simply discharged to the atmosphere.

The potatoes delivered to the conveyor 32 are free from all stones, clods and vines and are in a relatively clean condition ready for storage or for delivery to market.

The apparatus herein described has proved to be very successful in operation. The purpose for the transfer apron 29 is to provide for the potatoes to be delivered onto the air cushion 85 from a position substantially coplanar therewith to avoid a drop of potatoes down onto the air cushion. If potatoes are dropped onto the air cushion, they will not be supported across the air outlet by the air cushion, but when rolled or transferred onto said air cushion from a position substantially coplanar therewith, they are supported across the outlet onto the conveyor 32. The percentage of potatoes which drop in passage across the air outlet is very small. A significant savings in labor cost is effected by the use of this automatic means of separating potatoes from stones and clods.

Thus it is seen that we have provided a relatively simply constructed and readily installed means in connection with a potato harvester embodying the use of air for the separation of potatoes from stones, clods and vines.

It will of course be understood that various changes may be made in the form, details, arrangement and proportions of the parts, without departing from the scope of applicants' invention which, generally stated, consists in a device capable of carrying out the objects above set forth, in the parts and combinations of parts disclosed and defined in the appended claim.

What is claimed is:
1. In connection with a potato harvesting machine, an apparatus for separating potatoes from stones and clods, having in combination:
   an open ended duct comprising a passage, the upper end of said duct forming an air outlet, the lower end portion of said duct forming a discharge outlet for stones and clods,
   said upper end of said duct being free of obstruction thereabove and having spaced sides and ends,
   means with respect to said passage supplying air with a velocity to form a potato supporting air cushion across said air outlet,
   a delivery conveyor having the end of its upper run extending to a point short of one side of said upper end of said duct,
   a roller substantially coextensive with the width of said conveyor mounted adjacent said upper run of said conveyor,
   means driving said roller on the order of twice the rate of speed of said conveyor to accelerate the discharge of potatoes therefrom with respect to the discharge of potatoes from said conveyor to add impetus to said potatoes across said air outlet,
   transfer apron means substantially coextensive with said roller extending from close proximity to said roller to the adjacent side of said upper end of said duct for delivering the potatoes, stones and clods onto said air cushion from a position substantially coplanar therewith, and
   a discharge conveyor running from adjacent the other side of said upper end of said duct.

References Cited

UNITED STATES PATENTS

| | | | |
|---|---|---|---|
| 1,160,792 | 11/1915 | Van Houten | 198—34 |
| 1,667,611 | 4/1928 | Thompson | 209—27 X |
| 2,448,446 | 8/1948 | La Pointe | 209—139 |
| 2,535,801 | 12/1950 | La Pointe | 209—139 X |
| 3,227,276 | 1/1966 | Leighton | 209—139 |
| 3,334,739 | 8/1967 | Jarvis | 209—136 X |
| 3,358,830 | 1281967 | Duncan | 209—136 X |
| 3,369,661 | 2/1968 | Bradshaw | 209—139 X |

FRANK W. LUTTER, *Primary Examiner.*

U.S. Cl. X.R.

209—147